US009614915B2

(12) United States Patent
Jain et al.

(10) Patent No.: US 9,614,915 B2
(45) Date of Patent: Apr. 4, 2017

(54) SEAMLESS PEER TO PEER INTERNET CONNECTIVITY

(71) Applicant: Google Inc., Mountain View, CA (US)

(72) Inventors: Arvind Jain, Los Altos, CA (US); Sreeram Ramachandran, Cupertino, CA (US)

(73) Assignee: Google Inc., Mountain View, CA (US)

( * ) Notice: Subject to any disclaimer, the term of this patent is extended or adjusted under 35 U.S.C. 154(b) by 121 days.

(21) Appl. No.: 14/461,571

(22) Filed: Aug. 18, 2014

(65) Prior Publication Data
US 2016/0050281 A1  Feb. 18, 2016

(51) Int. Cl.
*H04L 29/08* (2006.01)
*H04L 29/06* (2006.01)

(52) U.S. Cl.
CPC .......... *H04L 67/141* (2013.01); *H04L 63/083* (2013.01); *H04L 67/104* (2013.01)

(58) Field of Classification Search
CPC ... H04L 67/141; H04L 67/104; H04L 63/083; H04L 63/123; H04W 12/04; H04W 12/06
See application file for complete search history.

(56) References Cited

U.S. PATENT DOCUMENTS

| | | | |
|---|---|---|---|
| 6,128,490 A | 10/2000 | Shaheen et al. | |
| 6,633,761 B1 | 10/2003 | Singhal et al. | |
| 7,263,070 B1 * | 8/2007 | Delker | H04L 29/12207 370/254 |
| 7,509,131 B2 | 3/2009 | Krumm et al. | |

(Continued)

FOREIGN PATENT DOCUMENTS

| | | |
|---|---|---|
| WO | 2013/020598 A1 | 2/2013 |
| WO | 2013/044359 A1 | 4/2013 |

(Continued)

OTHER PUBLICATIONS

Adib, et al., U.S. Appl. No. 62/018,616, filed Jun. 29, 2014.*

(Continued)

*Primary Examiner* — Joseph P Hirl
*Assistant Examiner* — J. Brant Murphy
(74) *Attorney, Agent, or Firm* — Shumaker & Sieffert, P.A.

(57) ABSTRACT

A system and methods for seamlessly providing access to a data network via a peer-to-peer connection service is provided. The peer-to-peer connection service is provided to a client device by a host device. The client device scans for available data network connections and recognizes a beacon broadcast by the host device. The beacon contains a unique identifier that indicates that the host device is configured to provide the peer-to-peer connection service. Upon recognizing the unique identifier, the client device transmits authentication credentials to the host device, which in turn transmits the authentication credentials to a server configured to determine whether a social media connection exists between a user account associated with the client device and a user account associated with the host device. If the social media connection exists, then the host device provides access credentials for the client device to access the peer-to-peer connection service.

12 Claims, 7 Drawing Sheets

(56) References Cited

U.S. PATENT DOCUMENTS

| | | | |
|---|---|---|---|
| 7,577,746 B2* | 8/2009 | Shima | H04L 29/06 709/227 |
| 7,848,292 B2 | 12/2010 | Bl et al. | |
| 8,131,317 B2 | 3/2012 | Lee | |
| 8,155,081 B1 | 4/2012 | Mater et al. | |
| 8,165,581 B2 | 4/2012 | Joshi et al. | |
| 8,200,217 B2 | 6/2012 | Kanade et al. | |
| 8,477,645 B2 | 7/2013 | Scherzer et al. | |
| 8,542,637 B2 | 9/2013 | Bandhakavi et al. | |
| 8,565,766 B2 | 10/2013 | Scherzer et al. | |
| 2005/0245269 A1 | 11/2005 | Demirhan et al. | |
| 2006/0098625 A1 | 5/2006 | King et al. | |
| 2006/0193295 A1 | 8/2006 | White et al. | |
| 2007/0037550 A1 | 2/2007 | Rassam | |
| 2007/0064684 A1 | 3/2007 | Kottilingal | |
| 2007/0064894 A1 | 3/2007 | Armstrong et al. | |
| 2007/0127391 A1 | 6/2007 | Goodman | |
| 2008/0002668 A1 | 1/2008 | Asokan et al. | |
| 2008/0233977 A1 | 9/2008 | Xu et al. | |
| 2009/0168757 A1 | 7/2009 | Bush | |
| 2009/0270045 A1* | 10/2009 | Flaherty | G06Q 20/3278 455/73 |
| 2010/0172323 A1 | 7/2010 | Rexhepi et al. | |
| 2011/0096673 A1 | 4/2011 | Stevenson et al. | |
| 2011/0216694 A1 | 9/2011 | Plasberg et al. | |
| 2011/0231507 A1* | 9/2011 | Appelman | G06Q 10/107 709/206 |
| 2011/0252079 A1* | 10/2011 | Werner | A63F 13/12 709/202 |
| 2011/0269423 A1 | 11/2011 | Schell et al. | |
| 2012/0108206 A1 | 5/2012 | Haggerty | |
| 2012/0178488 A1 | 7/2012 | Jonker et al. | |
| 2013/0160101 A1* | 6/2013 | Hakola | H04W 76/023 726/7 |
| 2013/0165117 A1 | 6/2013 | Narayanan | |
| 2013/0225169 A1 | 8/2013 | Farnsworth et al. | |
| 2013/0227647 A1* | 8/2013 | Thomas | H04L 63/0823 726/3 |
| 2013/0230023 A1 | 9/2013 | Gray et al. | |
| 2013/0303156 A1 | 11/2013 | Astrom et al. | |
| 2014/0071895 A1 | 3/2014 | Bane et al. | |
| 2014/0080539 A1 | 3/2014 | Scherzer et al. | |
| 2014/0127992 A1 | 5/2014 | Kuscher et al. | |
| 2014/0148100 A1 | 5/2014 | Kim et al. | |
| 2014/0148170 A1 | 5/2014 | Damji et al. | |
| 2014/0162601 A1* | 6/2014 | Kim | H04W 12/06 455/411 |
| 2014/0199969 A1* | 7/2014 | Johnsson | H04W 56/00 455/411 |
| 2014/0211648 A1 | 7/2014 | Rahmati et al. | |
| 2014/0213256 A1 | 7/2014 | Meylan et al. | |
| 2014/0250204 A1* | 9/2014 | Shalunov | H04L 67/02 709/217 |
| 2014/0366105 A1* | 12/2014 | Bradley | H04W 12/08 726/5 |
| 2015/0319644 A1* | 11/2015 | Grunenberger | H04W 88/10 370/338 |
| 2015/0356289 A1* | 12/2015 | Brown | G06F 21/44 726/7 |
| 2016/0007387 A1* | 1/2016 | Adib | H04W 76/02 370/329 |
| 2016/0007394 A1* | 1/2016 | Hassan | H04W 76/022 455/450 |

FOREIGN PATENT DOCUMENTS

| | | |
|---|---|---|
| WO | 2013162196 A1 | 10/2013 |
| WO | 2014031829 A2 | 2/2014 |

OTHER PUBLICATIONS

International Search Report and Written Opinion from International Application No. PCT/US2015/044827, dated Dec. 21, 2015, 14 pp.
Ge et al., "A History-Based Handover Prediction for LTE Systems" Computer Network and Multimedia Technology. CNMT. International Symposium on , vol., No., pp. 1,4, 18-20 (Jan. 2009).
Gemalto N.V. "Card ADMIN," Document Reference D1225357A (Jun. 2, 2011).
Dicoda.com. "Multi IMSI," Dicoda.com (Jun. 20, 2013) (available at: https://web.archive.org/web/20130620191315/http://www.dicoda.com/introduction/imsi).
Higginbotham, Stacey. "Is Apple About to Cut Out the Carriers?" Gigaom.com (Oct. 27, 2010) (available at: http://gigaom.com/2010/10/27/is-apple-about-to-cut-out-the-carriers/).
Tobias, Marc Weber. "The Split Personality Cell Phone That Saves You Money on Overseas Calling," Forbes.com (Aug. 20, 2013) (available at: http://onforb.es/14gMCe4).
"Circuit-switched fallback. The first phase of voice evolution for mobile LTE devices." Qualcomm Incorporated, 2012 11 pages.
CMSG. "Reprogrammable SIMs: Technology, Evolution and Implications," Final Report (Sep. 25, 2012) (available at: http://stakeholders.ofcom.org.uk/binaries/research/telecoms-research/reprogrammable-sims.pdf).
"Feature Requests—Republic Wireless Wiki," http://republic-wireless.wikia.com/wiki/Feature_Requests 1 page.
"Republic Wireless," http://republicwireless.com 2 pages.
"T-Mobile's 4G Network—Check Your Coverage—T-Mobile Blazing Fast 4G Coverage" 9 pages.
"What is VoLTE | Voice Over LTE | Tutorial," Radio-Electronics.com, http://www.radio-electronics.com/info/cellulartelecomms/lte-long-term-evolution/voice-over-lte-volte.php 5 pages.
Korean Intellectual Property Office, International Search Report and the Written Opinion in International Application No. PCT/US2014/057709 Dec. 29, 2014.

* cited by examiner

SEAMLESS PEER TO PEER INTERNET CONNECTIVITY

BACKGROUND OF THE INVENTION

A wireless data network connection is typically not as reliable as a wired data network connection. For instance, a client device may be out of a coverage range of a wireless data network or may have entered an area where a wireless signal for the wireless data network is weak and therefore unable to offer a high quality of service. In these situations, the client device will search for other wireless data networks to provide the wireless data connection. One such wireless data network could be a peer-to-peer data connection offered from a second client device that currently has a higher quality wireless data connection.

In this connection configuration, the second wireless client device functions as a host device for the client device. The host device may have a higher quality wireless data connection because its specific geographic location provides it with a better line of sight access to the wireless data network or it may operate over entirely different wireless data network that provides service in that specific geographic location.

Therefore, the host device will be able to provide a wireless data connection to the client device by functioning as a wireless access point for the client device. One such peer-to-peer data connection service that may be utilized to provide this peer-to-peer connectivity is WiFi Direct®. However, prior to the client device utilizing the data connection of the host device, the client device typically must be able to provide access credentials for the host device. Typically, this requires the user of the host device providing a user of the client device with the access credentials for utilizing the host device in the aforementioned wireless access point configuration.

BRIEF SUMMARY OF THE INVENTION

One embodiment provides a method of seamlessly connecting a client device to a peer-to-peer connection service provided by a host device, the method comprising: scanning for available wireless networks; determining the peer-to-peer connection service is being provided by the host device; transmitting authentication credentials to the host device; receiving an indication of availability of the peer-to-peer connection service from the host device, wherein the indication of availability is based on the authentication credentials indicating a connection between a user account associated with the client device and a user account associated with the host device; and conditionally establishing a data connection with the host device over the peer-to-peer connection service based on the indication of availability.

Another embodiment provides a method of seamlessly providing a network connection to a client device over a peer-to-peer connection service provided by a host device, the method comprising: broadcasting a unique identifier indicating that a peer-to-peer connection service is available; receiving authentication credentials from the client device; providing the authentication credentials to an authentication service configured to determine a user account of the client device; determining a connection between the user account of the client device and a user account of the host device; providing an indication of availability of the peer-to-peer connection service, wherein the indication of availability is based on the connection between the user account associated with the client device and the user account associated with the host device; and conditionally establishing a data connection with the client device over the peer-to-peer connection service based on the indication of availability.

Yet another embodiment provides a system for seamlessly providing a peer-to-peer connection service, the system comprising: a client device including a network interface and a network connectivity module; a host device configured to provide a peer-to-peer connection service to the client device, the host device includes a network interface connected to a data network; a server running an authentication service, wherein the authentication service is configured to authenticate the client device based on authentication credentials of the client device provided to the server by the host device; and a social media database, wherein the social media database is queried by the server to determine a connection between a user account of the client device and a user account of the host device based on a relationship between the client device and the host device as contained in the social media database.

DETAILED DESCRIPTION OF THE INVENTION

A wireless data network connection is typically not as reliable as a wired data network connection. For instance, a client device may be out of a coverage range of a wireless data network or may have entered an area where a wireless signal for the wireless data network is weak and therefore unable to offer a high quality of service. In these situations, the client device will search for other wireless data networks to provide the wireless data connection. One such wireless data network could be a peer-to-peer data connection offered from a second client device that currently has a higher quality wireless data connection.

In this connection configuration, the second wireless client device functions as a host device for the client device. The host device may have a higher quality wireless data connection because its specific geographic location provides it with a better line of sight access to the wireless data network or it may operate over an entirely different wireless data network that provides service in that specific geographic location.

Therefore, the host device will be able to provide a wireless data connection to the client device by functioning as a wireless access point for the client device. One such peer-to-peer data connection service that may be utilized to provide this peer-to-peer connectivity is WiFi Direct®.

However, prior to the client device utilizing the data connection of the host device, the client device typically must be able to provide access credentials for the host device. Typically, this requires the user of the host device providing a user of the client device with the access credentials for utilizing the host device in the aforementioned wireless access point configuration.

Having to obtain the access credentials from a user prior to being connected to the host device is both time consuming and tedious, as it typically requires entry of an alphanumeric code to indicate to the host device that the client device should be granted access. To save time and make the data hosting service less tedious, the peer-to-peer connection between the client device and the host device should be made seamless. One such system capable of seamlessly establishing this peer-to-peer data connection is illustrated as a seamless peer-to-peer data connection system 100 illustrated in FIG. 1.

Figure 1:
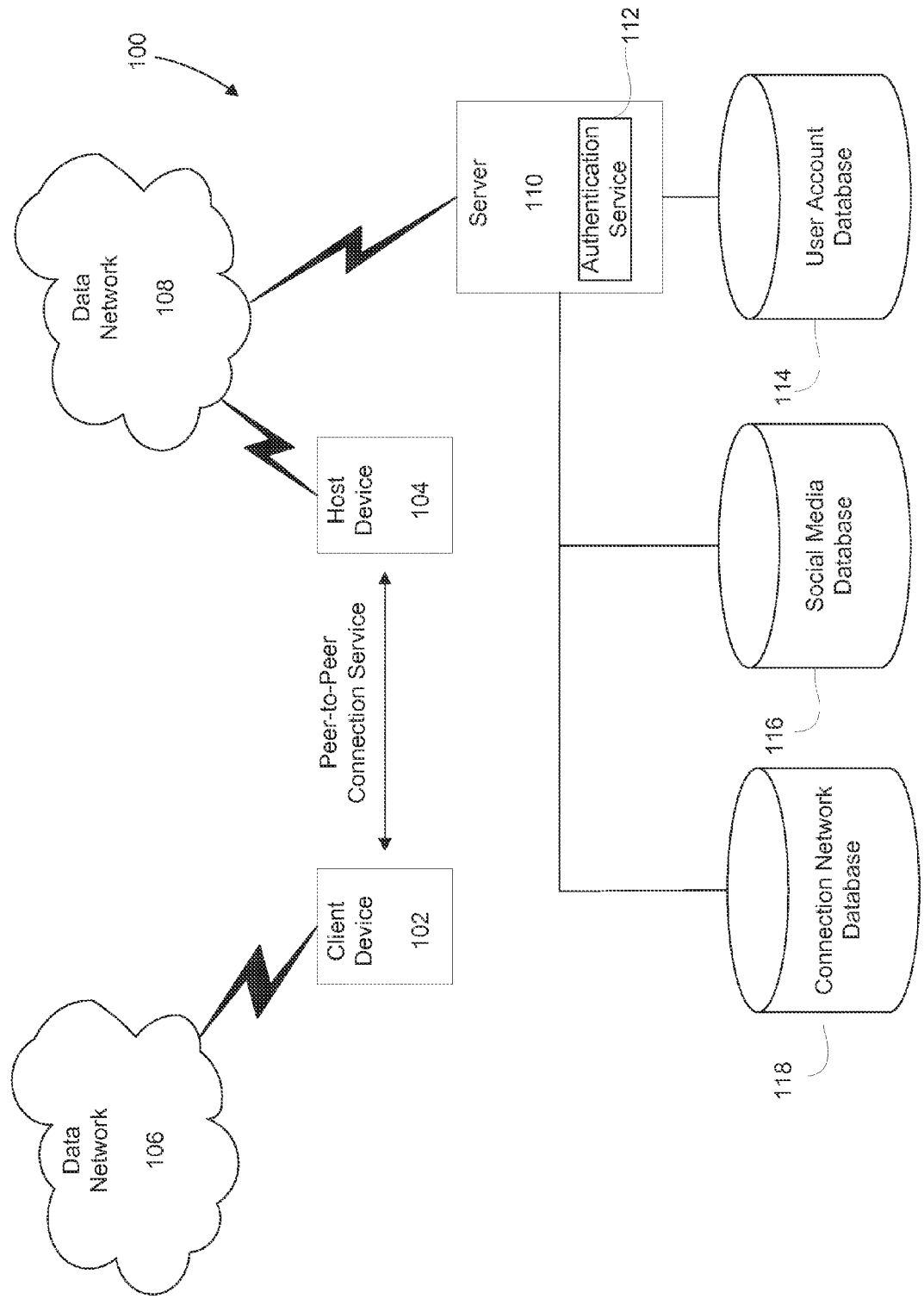
FIG. 1 is a system for seamlessly providing a peer-to-peer connection service to a client device, according to an example embodiment.

FIG. 1 includes the client device 102 and the host device 104. Client device 102 is illustrated as being connected to data network 106, which, in accordance with embodiments of the disclosure contained herein, represents a data network that either provides a weak or nonexistent data connection to the client device 102 based on its current location. The host device 104 enjoys a higher quality data connection over data network 108, which the client device 102 is unable to access.

The client device 102 and host device 104 may be mobile devices such as a smart phone, a tablet computer, a laptop computer, a watch with a computer operating system, a personal digital assistant (PDA), a video game console, a wearable or embedded digital device(s), or any one of a number of additional devices capable of communicating over at least one of data network 106 or data network 108.

Data networks 106 and 108 may be any wireless data network that provides a data connection to client devices. For instance, data networks 106 and 108 may include but are not limited to Wide Area Networks (WAN) such as a Long Term Evolution (LTE) network, a Global System for Mobile Communications (GSM) network, a Code Division Multiple Access (CDMA) network, Wireless Local Area Networks (WLAN) such as the various IEEE 802.11 standards, or any other kind of data network. Data networks 106 and 108 allow communication with the server 110. For example, host device 104 may transmit information to the server 110 and receive information from the server 110 through data network 108. Further, the data network 106 and 108 may include a set of cell towers, as well as a set of base stations and/or mobile switching centers (MSCs). In some embodiments, data networks 106 and 108 may include various cell tower/base station/MSC arrangements.

In order for the client device 102 to enjoy the higher quality data connection over data network 108, the host device 104 may provide a peer-to-peer data connection service to the client device 102. Prior to forming the peer-to-peer data connection, the client device 102 will search for all available wireless connections, as the current connection to data network 106 is either very weak or nonexistent. In embodiments of the invention, this search will result in the client device 102 finding a beacon signal provided by the host device 104 that indicates that the host device 104 is configured to provide a peer-to-peer data connection service. The beacon may broadcast a unique identifier that indicates that the host device 104 is configured to provide the peer-to-peer data connection service, as opposed to a plurality of other potential host devices not configured to provide the peer-to-peer connection service. In certain embodiments, the unique identifier will only be unique to the extent that it indicates that the peer-to-peer connection service is available as opposed to other available networks that do not offer this peer-to-peer connection service. For instance, the unique identifier may include a specific text string as at least part of the Service Set Identifier (SSID) that indicates that particular host device is configured to provide the peer-to-peer connection service. This specific text sting located within the SSID may be common among host devices offering the peer-to-peer connection service.

Upon recognizing the unique identifier in the beacon broadcast by the host device 104, the client device 102 will transmit authentication credentials to the host device 104. The authentication credentials may include one or both of user account information that provides an identity of the user of the of the client device 102 and/or a social media identifier associated with a social media user account of the user of the client device 102.

As an aside, the user account information is unique to the user of the client device 102 in order to identify the individual user such that any device utilizing that user account will be associated with that particular user. The social media identifier provides a unique identification of the user within a social media environment. The social media environment is any environment that provides a type or classification of connection between various users of that social media. For instance, one such social media environment would allow users to identify each other based on a relationship status such as friends, family or colleagues in order to provide a network of connections. Other types of social media environments may include an internal list or network of employees within a company.

Upon receiving the authentication credentials from the client device 102, the host device 104 proceeds to verify the authentication credentials prior to providing access to the data network 108. To verify the authentication credentials the host device 104 will provide the authentication credentials of the client device 102 to an authentication service 112 operating on server 110. The authentication service 112 proceeds to verify the client device 102 by utilizing the authentication credentials to look up an identity of the user of the client device 102 in a user account database 114.

In certain embodiments, a user of the host device 104 may configure the host device 104 to offer the peer-to-peer connection to any user of the client device 102 identified as being associated with the user of the host device 104 through social media. Varying levels of connection in social media exist. For instance, in certain embodiments, the user of the host device 104 could configure the host device 104 to provide the peer-to-peer connection to only connections identified as being a work colleague, a friend or a family member. In other embodiments, the user of the host device 104 could configure the host device 104 to provide the peer-to-peer connection service generally to anyone identified as being a connection in various types of social media.

Therefore, prior to providing access to the peer-to-peer connection service of the host device 104, the authentication service 112 will query a social media database 116 using the social media identifier associated with the user account of the client device 102 provided in the authentication credentials and a social media identifier associated with the user account of the host device 104. The query from the authentication service 112 to the social media database 116 cross references a social media account of the user of the host device 104 to determine whether the user of the client device 102, as identified using the social media identifier in the authentication credentials, is connected to the user of the host device 104 through social media, and at what level, such as a friend, a family member, a work colleague or any other type of connection. In one embodiment, searching social media is done using an Application Protocol Interface (API) developed to determine connections in social media.

If a connection via social media is determined and the connection is at a level such that the user of the host device 104 has indicated that the peer-to-peer connection should be provided, then the host device 104 will provide access credentials to the client device 102 that will allow the client device 102 to access the data network 108 through the host device 104 configured as an access point for the data network 108.

In some embodiments, upon receiving the access credentials, the client device 102 will provide the access credentials to the server 110, which will in turn store the access credentials in a database such as connection network database 118 associated with the user account of the user of the client device 102. In these embodiments, the connection network database 118 stores access credentials for any network the client device 102 is granted access to. Accordingly, for future requests to configure the peer-to-peer connection, the client device 102 will be able to utilize the access credentials to configure the host device 104 to function as an access point for the data network 108. Further, the access credentials will be utilized with other client devices associated with the user account associated with client device 102.

In certain embodiments, the user of the host device 104 will be able to monitor a list of client devices that have the access credentials for configuring the host device 104 as an access point. The user of the host device 104 will be able to remove either a single client device or groups of client devices by either changing the preference of social media connection that are allowed to utilize the host device 104 as an access point or by removing a specific client device in the list of client devices.

As an aside, in certain embodiments, the peer-to-peer connection service may be a supplemental connection. For instance, in a configuration where the client device 102 still has access to the data network 106, the client device 102 may still attempt to gain access to the host device 104 in order to supplement the connection to the data network 106. Additionally, the client device 102 may set up a supplemental peer-to-peer connection via a supplemental host device (not illustrated) in addition to the peer-to-peer connection to the host device 104. In this regard, the client device 102 may be connected to multiple host devices simultaneously. Configuration of the supplement host device is accomplished in a similar fashion to the configuration of the host device 104 to provide the peer-to-peer connection service.

As a further aside, in certain embodiments, the data network 106 and data network 108 may be the same data network where only host device 104 is provided with a high quality data connection while client device 102 only has a weak or nonexistent data connection. In other embodiments, the data network 106 and data network 108 are separate networks where only data network 108 provides a high quality data connection in the specific geographic location of the client device 102 and host device 104.

As a further aside, the peer-to-peer connection may be hosted by the host device 104 utilizing a variety of technologies, any of which are capable of seamlessly authenticating a client device 102 for communication over the host device 104. For instance, the peer-to-peer connection may be established via Bluetooth, USB or WiFi Direct®. In the instance where the connection is established using WiFi Direct®, the client device 102 and host device 104 will be paired such that many types of application data may be shared between the two devices with one being access to the data network 108.

As a further aside, in FIG. 1 server 110 is shown separately from the connection network database 118, the social media database 116 and the user account database 114. This specific architecture is illustrated in this manner for explanatory purposes, as the various databases could be only a single database or multiple databases accessed by the server 110. Alternatively, in other architectures, memory associated with the server 110 could be utilized as the illustrated databases and therefore, the illustrated databases would be encompassed within the server 110.

Figure 2:
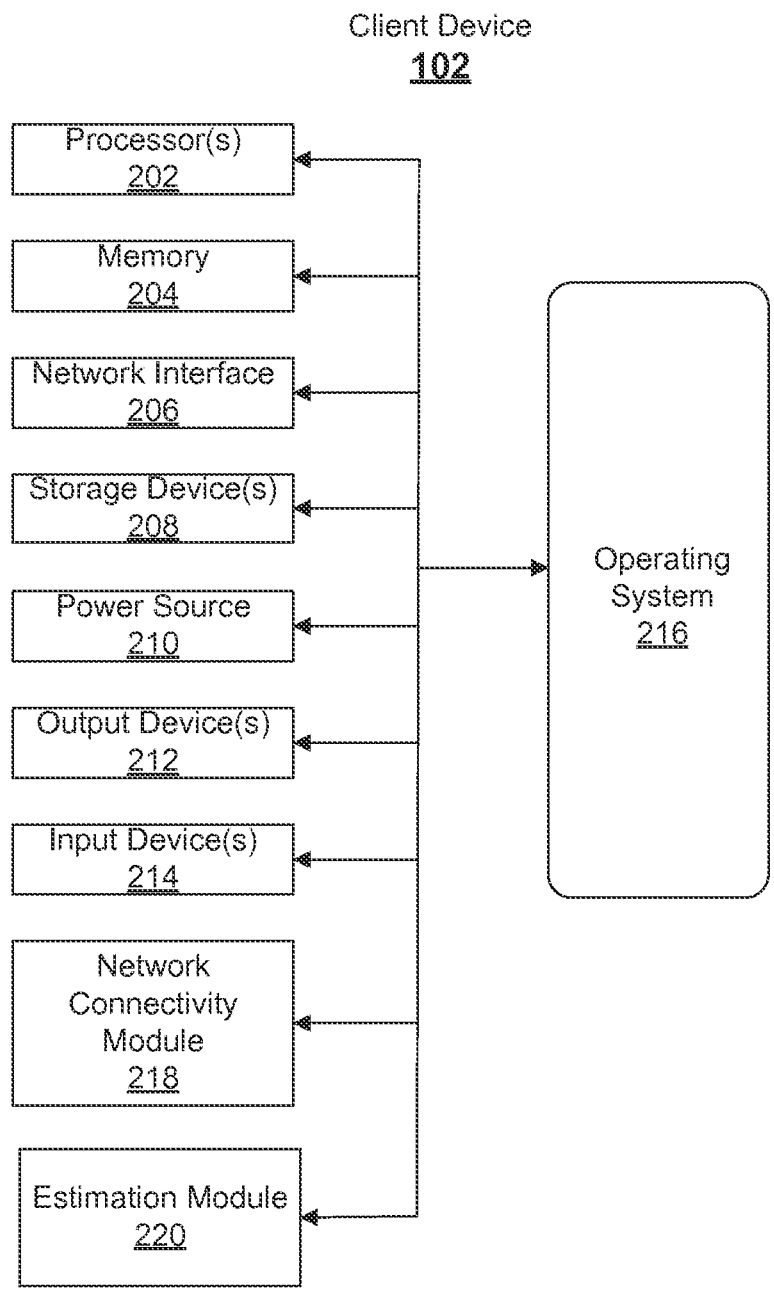
FIG. 2 is a block diagram illustrating components of a client device of FIG. 1, according to one embodiment.

Turning now to FIG. 2, a block diagram of basic functional components for the client device 102 of FIG. 1, according to one aspect of the disclosure, is illustrated. In general, many other embodiments of the client device 102 may be used. In the illustrated embodiment of FIG. 2, the client device 102 includes one or more processors 202, memory 204, a network interface(s) 206, one or more storage devices 208, power source 210, one or more output devices 212, one or more input devices 214, a network connectivity module 218, and an estimation module 220. The client device 102 also includes an operating system 216. Each of the components including the processor 202, memory 204, network interface 206, storage device 208, power source 210, output device 212, input device 214, network connectivity module 218, estimation module 220 and the operating system 216 are interconnected physically, communicatively, and/or operatively for inter-component communications.

As an aside, host device 104 may be equipped with similar functionality. For ease of description, the functionality will be described in relation to client device 102, but in certain embodiments host device 104 is equipped with similar functionality. However, rather than scanning for an available beacon indicating that a hosting service is available, the host device 104 will be broadcasting that beacon and communicating with the server 110 (see FIG. 1) over the network interface 206, which is connected to the data network 108 in order to host the data connection for the client device 102.

As illustrated, processor 202 is configured to implement functionality and/or process instructions for execution within client device 102. For example, processor 202 executes instructions stored in memory 204 or instructions stored on a storage device 208. Memory 204, which may be a non-transient, computer-readable storage medium, is configured to store information within client device 102 during operation. In some embodiments, memory 204 includes a temporary memory, an area for information not to be maintained when the client device 102 is turned off. Examples of such temporary memory include volatile memories such as random access memories (RAM), dynamic random access memories (DRAM), and static random access memories (SRAM). Memory 204 also maintains program instructions for execution by the processor 202.

Storage device 208 also includes one or more non-transient computer-readable storage media. The storage device 208 is generally configured to store larger amounts of information than memory 204. The storage device 208 may further be configured for long-term storage of information. In some examples, the storage device 208 includes non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The client device 102 uses network interface(s) 206 to communicate with external devices via one or more networks, such as the data networks 106 and 108 of FIG. 1. Network interface(s) 206 may be a network interface card, such as an Ethernet card, an optical transceiver, a radio frequency transceiver, or any other type of device that can send and receive information.

Other non-limiting examples of network interfaces include Bluetooth®, 2G, 3G, 4G and Wi-Fi radios in client computing devices, and USB.

The client device 102 includes one or more input devices 214. Input devices 214 are configured to receive input from a user or a surrounding environment of the user through tactile, audio, and/or video feedback. Non-limiting examples of input device 214 include a presence-sensitive screen, a mouse, a keyboard, a voice responsive system, video camera, microphone or any other type of input device. In some examples, a presence-sensitive screen includes a touch-sensitive screen.

One or more output devices 212 are also included in client device 102. Output devices 212 are configured to provide output to a user using tactile, audio, and/or video stimuli. Output device 212 may include a display screen (part of the presence-sensitive screen), a sound card, a video graphics adapter card, or any other type of device for converting a signal into an appropriate form understandable to humans or machines. Additional examples of output device 212 include a speaker such as headphones, a cathode ray tube (CRT) monitor, a liquid crystal display (LCD), or any other type of device that can generate intelligible output to a user.

The client device 102 includes one or more power sources 210 to provide power to the device. Non-limiting examples of power source 210 include single-use power sources, rechargeable power sources, and/or power sources developed from nickel-cadmium, lithium-ion, or other suitable material.

The client device 102 includes an operating system 216. The operating system 216 controls operations of the components of the client device 102. For example, the operating system 216 facilitates the interaction of the processor(s) 202, memory 204, network interface 206, storage device(s) 208, input device 214, output device 212, power source 210, network connectivity module 218 and the estimation module 220.

In certain embodiments of the disclosure, the client device 102 further includes a network connectivity module 218. The network connectivity module 218 determines, at any given point in time, which available wireless network connection(s) to use. As part of this functionality, the network connectivity module 218 scans for the beacon from the host device 104.

In the event that a beacon from the host device 104 is discovered, the network connectivity module 218 will access the estimation module 220, which may or may not be functionally part of the network connectivity module 218. As illustrated, the estimation module 220 is separate from the connectivity module 218; however, in certain embodiments, the estimation module 220 is configured as part of the network connectivity module 218.

The estimation module 220 is configured to estimate the quality of data connection available through the peer-to-peer communication with the host device 104. If the estimation module 220 indicates that peer-to-peer communication with the host device 104 offers a higher quality data connection to the data network 108 (see FIG. 1) then other currently available data connections, then the network connectivity module 218 will transmit the authentication credentials to the host device 104 in order to authenticate the client device 102 for peer-to-peer communication with host device 104. One such method of estimating the quality of the data connection is to request an indication of the signal strength of the data network 108 as observed by the host device 104. In certain embodiments, upon receiving a request from the estimation module 220 of the client device 102, the host device 104 may transmit a Received Signal Strength Indicator (RSSI) measurement back to the estimation module 220.

In the event that the client device 102 is allowed to connect to the host device 104, the network connectivity module 218 will proceed to set up communication with the host device 104. In this regard, the network connectivity module 218 will cause the client device 102 to communicate with data network 108 (see FIG. 1) such that all network traffic is sent and received via the peer-to-peer connection with host device 104. In this configuration, the host device 104 is configured to receive any incoming network traffic from the client device 102 and forward it to the data network 108 and proxy back the content coming from the data network 108 to the client device 102.

In certain embodiments of the disclosure, the network connectivity module 218 and the estimation module 220 are provided as operational states of the processor(s) 202. In these embodiments, the processor(s) 202 are configured to utilize any additional functionality from various other system modules, such as the network interface(s) 206 in order to configure the processor(s) 202 to provide the functionality of the network connectivity module 218 and the estimation module 220, as described above.

Figure 3:
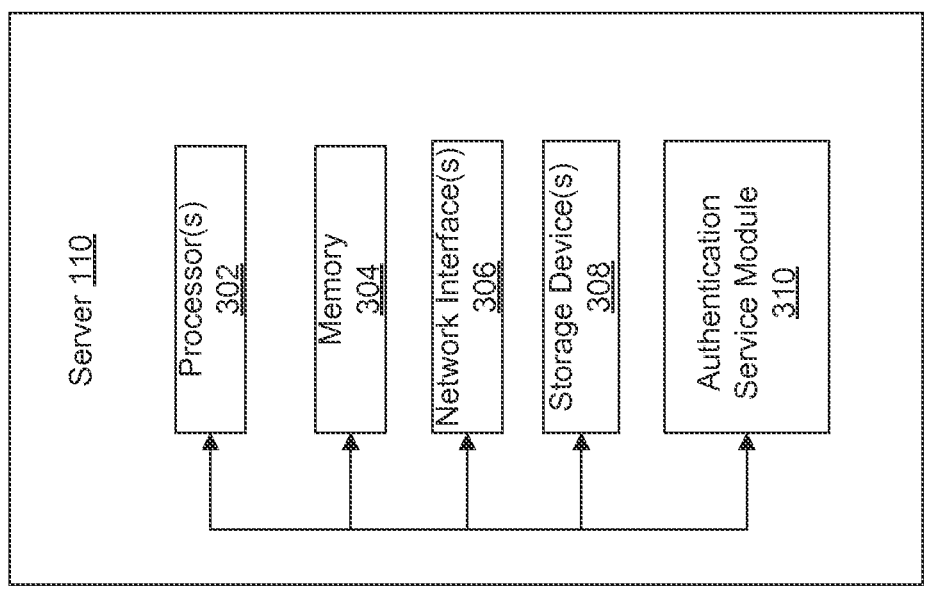
FIG. 3 is a block diagram illustrating a server of FIG. 1, according to one embodiment.

Turning now to FIG. 3, a block diagram of basic functional components for a server 110 is depicted, according to one aspect of the disclosure. While server 110 is illustrated as a single server, in other embodiments, server 110 may be configured as multiple servers or a cloud based server.

The server 110 includes one or more processors 302, memory 304, network interface(s) 306, one or more storage devices 308 and an authentication service module 310. In some embodiments, each of the components including the processor(s) 302, memory 304, network interface(s) 306, storage device(s) 308 and authentication service module 310 are interconnected physically, communicatively, and/or operatively for inter-component communications.

As illustrated, processors 302 are configured to implement functionality and/or process instructions for execution within the server 110. For example, processors 302 execute instructions stored in memory 304 or instructions stored on storage devices 308. Memory 304, which may be a non-transient, computer-readable storage medium, is configured to store information within server 110 during operation. In some embodiments, memory 304 includes a temporary memory, i.e. an area for information not to be maintained when the server 110 is turned off. Examples of such temporary memory include volatile memories such as random access memories (RAM), dynamic random access memories (DRAM), and static random access memories (SRAM). Memory 304 also maintains program instructions for execution by the processors 302.

Storage devices 308 also include one or more non-transient computer-readable storage media. Storage devices 308 are generally configured to store larger amounts of information than memory 304. Storage devices 308 may further be configured for long-term storage of information. In some examples, storage devices 304 include non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The server 110 uses network interface(s) 306 to communicate with external devices via one or more networks, such as the data networks 106 and 108 of FIG. 1. Such networks may also include one or more wireless networks, wired networks, fiber optics networks, and other types of networks through which communication between the server 110 and an external device may be established. Network interface(s) 306 may be a network interface card, such as an Ethernet card, an optical transceiver, a radio frequency transceiver, or any other type of device that can send and receive information.

The server 110 includes the authentication service module 310. In certain embodiments, where the server 110 is a group of servers or a cloud based server, the authentication service module 310 is configured as a cloud based application. The authentication service module 310 receives the authentication credentials of the client device 102 from the host device 104 (see FIG. 1). In certain embodiments, the authentication service module 310 is configured to access at least one of the user account database 114 and/or the social media database 116 utilizing information regarding the user of the client device 102 contained in the access credentials. In certain embodiments, the access credentials provide user account information for the user of the client device 102. The user account information allows the authentication service module 310 to look up an identity of the user of the client device 102 in order to authenticate the client device 102.

In certain embodiments, the authentication credentials from the client device 102 will further contain a social media identifier associated with the user account of the client device 102. In these embodiments, once the user of the client device 102 is authenticated, the authentication service module 310 will access the social media database 116 (see FIG. 1) to determine whether a social media connection exists between the user account of the client device 102 and the user account of the host device 104. If the social media connection exists and the connection is at a relationship level that the user of the host device 104 has indicated that the peer-to-peer connection should be allowed, then the authentication service module 310 provides indication to the host device 104 that access credentials should be supplied to the client device 102.

After establishing the peer-to-peer connection, in certain embodiments, the authentication service module 310 will cause the access credentials of the host device 104 to be stored in a connection network database 118 (see FIG. 1) associated with the client device 102. The connection network database 118 provides storage of access credentials for any network that the user account associated with the client device 102 has access to. In these embodiments, the authentication service module 310 will indicate that access to the host device 104 be granted, based on the previously stored access credentials, without performing an additional search of the social media database 116.

As an aside, in certain embodiments, if the user of the host device 104 changes the preferences regarding what level of social media contact can access the host device 104, then the authentication process utilizing the authentication service module 310 will perform a search of the social media database 116 regardless of whether the connection network database 118 indicates that the client device 102 has access credentials for the host device 104. Additionally, in certain embodiments, the user of the host device 104 may access a list of users that have access credentials for the host device 104 and remove one or more users from the list. In these embodiments, the authentication process utilizing the authentication service module 310 will perform a search of the social media database 116 regardless of whether the connection network database 118 indicates that the client device 102 has access credentials for the host device 104.

Figure 4:
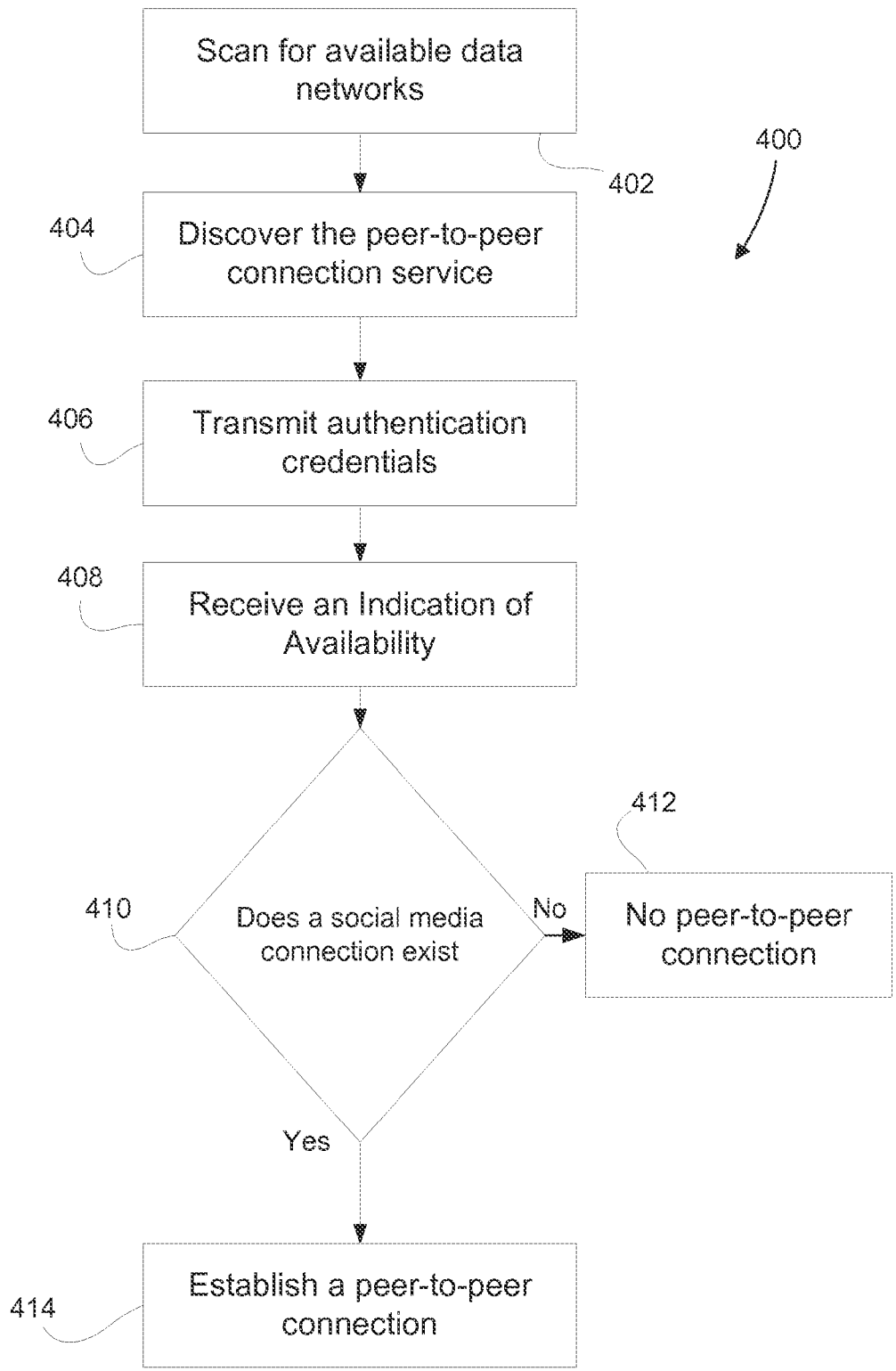
FIG. 4 is a flow diagram associated with the client device of FIG. 1, according to one embodiment.

Turning to FIG. 4, a flow chart 400 is illustrated. The flow chart 400 provides steps for seamlessly connecting the client device 102 (see FIG. 1) to a peer-to-peer connection service provided by the host device 104. At step 402, the network connectivity module 218 (see FIG. 2) of the client device 102 scans for available data networks, and at step 404 the network connectivity module 218 discovers the availability of the peer-to-peer connection service. In one embodiment, the network connectivity module 218 will discover the beacon broadcast by the host device 104.

At step 406, the network connectivity module 218 causes the client device 102 to transmit authentication credentials to the host device 104. Prior to transmitting the authentication credentials, the network connectivity module 218 will query the estimation module 220 to verify that the peer-to-peer connection offers a higher quality of service than other available data networks.

At step 408, the client device 102 receives an indication of availability of the host device 104 to provide the peer-to-peer connection service to the client device 102. The indication of availability is based on an authentication process performed by the host device 104 and a server 110 (see FIG. 1). The authentication process utilizes the authentication credentials to determine a user of the client device 102. The authentication credentials contain user account information associated with the user of the client device 102, which the server 110 utilizes to query a user account database 114 to determine the identity of the user. The authentication credentials further contain a social media identifier associated with the user account of the client device 102, which allows the server 110 to query the social media database 116 to determine whether a social media connection exists between the user account of the client device 102 and the user account of the host device 104. This determination is made by comparing the social media identifier in the authentication credentials with a list of social media connections associated with the user account of the host device 104. Based on the determination, the server 110 provides the host device 104 with information pertaining to whether the user of the client device 102 is a social media connection of the user of the host device 104. In certain embodiments, the server 110 may also return a type of connection, such as a work colleague, a friend or a family member.

At step 410, if the indication of availability shows that a social media connection does not exist, then at step 412, the peer-to-peer connection service is denied. However, if the indication of availability shows that the social media connection exists, then the client device 102 receives access credentials from the host device 104 and proceeds to establish the peer-to-peer connection with host device 104.

Figure 5:
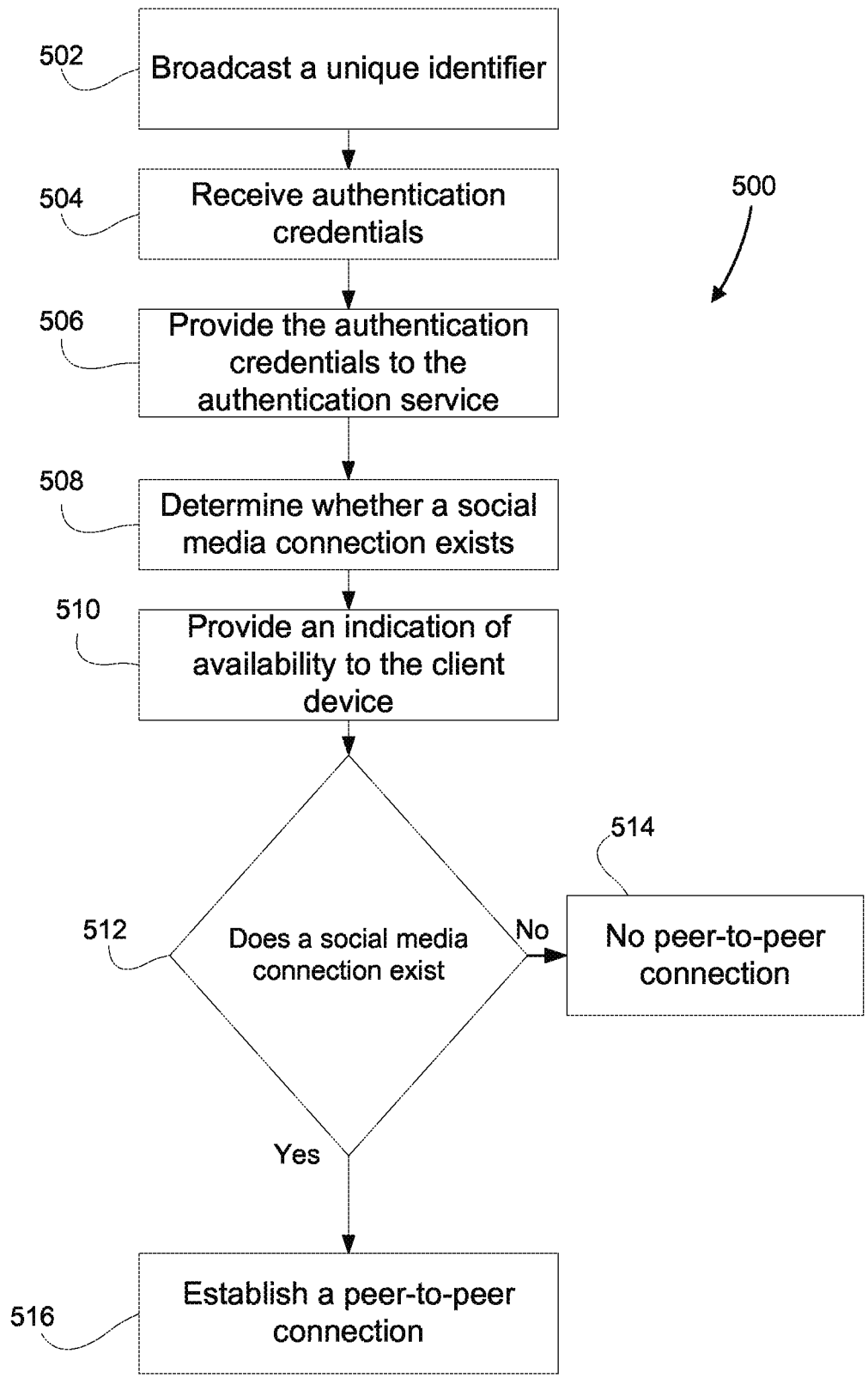
FIG. 5 is a flow diagram associated with the host device of FIG. 1, according to an example embodiment.

Turning to FIG. 5, a flow chart 500 is illustrated. The flow chart 500 provides steps for seamlessly providing a peer-to-peer connection service to the client device 102 (see FIG. 1) by the host device 104. At step 502, the host device 104 broadcasts a beacon containing the unique identifier that indicates the host device 104 is configured to provide the peer-to-peer connection service. At step 504, the host device 104 receives the authentication credentials from the client device 102, where the authentication credentials include at least the social media identifier associated with the user account of the client device 102. At step 506, the host device 104 provides the authentication credentials to the server 110.

At step 508, the host device 104 determines whether a social media connection exists. To accomplish this, the host device 104 provides a social media identifier associated with the user account of the host device 104 to the server 110 (see FIG. 1). The server 110 queries the social media database 116 based on the social media identifier associated with the user account of the host device 104 to determine whether the social media identifier received from the client device 102, provided in the authentication credentials, is a social media connection. The result of the query returns to the host device 104 an indication of whether the user of the client device 102 is a social media connection and, in certain embodiments, a type of connection, such as a work colleague, a friend or a family member.

At step 512, if the server 110 indicates that the user of the client device 102 is not a social media connection of the user of the host device 104, then at step 514, the host device 104 provides an indication of availability to the client device 102 that indicates that the host device 104 is not available to provide the peer-to-peer connection service. However, if the server 110 indicates that the user of the client device 102 is a social media connection of the user of the host device 104, then at step 514, the host device 104 provides an indication of availability to the client device 102 that indicates that the host device 104 is available to provide the peer-to-peer connection service along with the access credentials for accessing the peer-to-peer connection service from the host device 104.

As an aside, the determination of whether to provide the peer-to-peer service can be based on more than a mere connection as indicated by social media. For instance, the user of the host device 104 could require that a mere connection is not enough and that the connection must be of a specific type, such as a work colleague, a friend or a family member in order to provide the peer-to-peer connection service.

Figure 6:
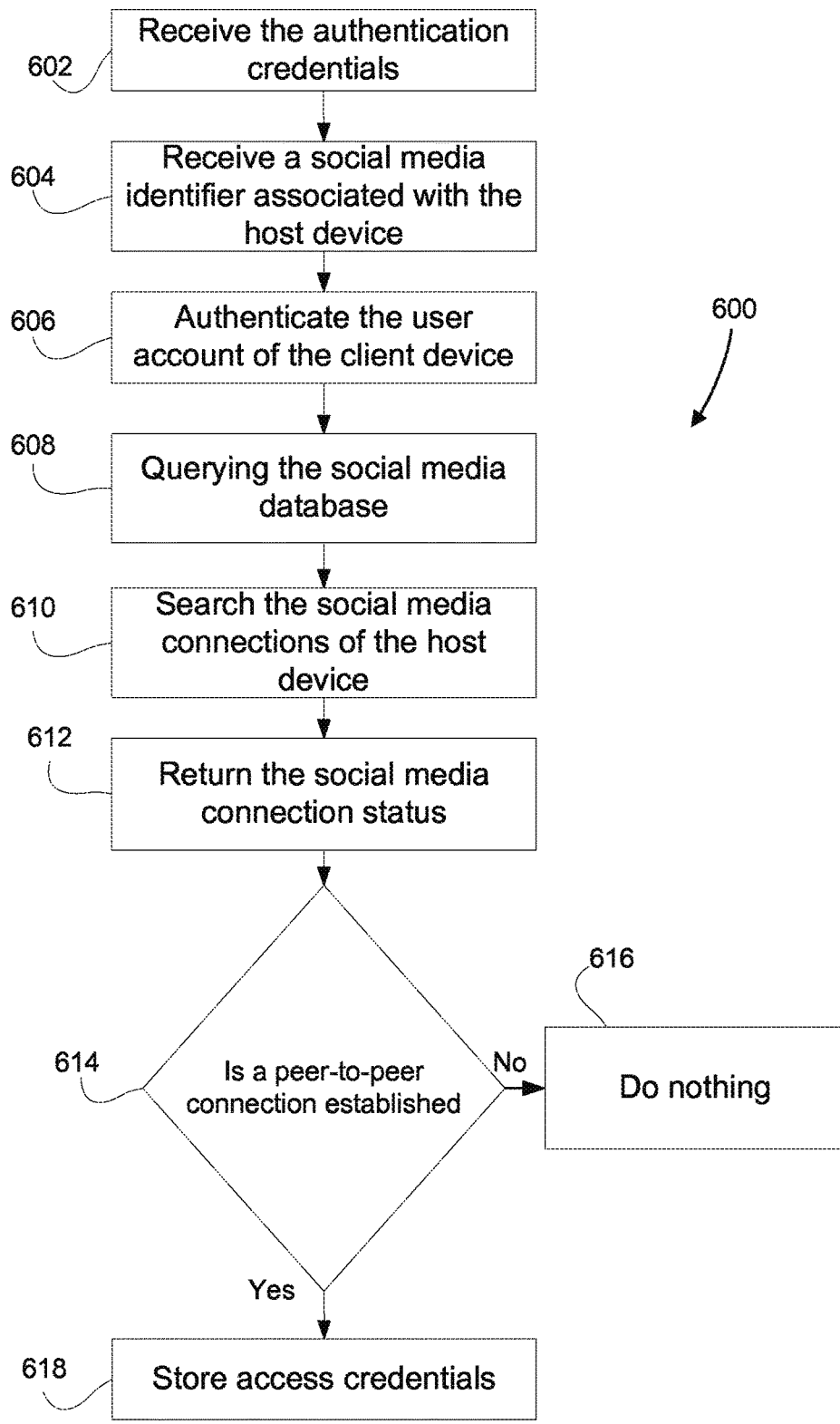
FIG. 6 is a is flow diagram associated with the server of FIG. 1, according to an example embodiment.

Turning to FIG. 6, a flow chart 600 is illustrated. The flow chart 600 provides steps for authenticating a user of the client device 102 (see FIG. 1), determining whether a social media connection exists between a user account associated with the client device 102 and a user account associated with the host device 104 and storing access credentials of the host device 104 in the connection network database 118. At step 602, the authentication service module 310 (see FIG. 3) of the server 110 receives the authentication credentials of the client device 102 from the host device 104. The authentication credentials include a user account identifier of user of the client device 102 and a social media identifier associated with the user account of the client device 102. At step 604, the authentication service module 310 receives a social media identifier associated with the user account of the host device 104.

At step 606, the authentication service module 310 (see FIG. 3) queries the user account database 114 (see FIG. 1) with the user account information from the authentication credentials in order to authenticate the user of the client device 102. At step 608, the authentication service module 310 queries the social media database 116 using the social media identifier associated with the user account of the host device 104 to determine a list of social media connections of the user of the host device 104. At step 610, the authentication service module 310 searches the list of social media connections for the social media identifier associated with the user account of the client device 102 to determine a social media connection status between the user account associated with the client device 102 and the user account associated with host device 104. At step 612, the authentication service module 310 returns the social media connection status to the host device 104. If the social media identifier associated with the user account of the client device 102 is found in the list of social media connections, the authentication service module 310 returns to the host device 104 an indication that the user account of the host device 104 is connected to the user account of the client device 102, and, in certain embodiments, the indication further includes a type of connection, such as a work colleague, a friend or a family member. If the social media identifier associated with the user account of the client device 102 is not found in the list of social media connections, the authentication service module 310 returns to the host device 104 an indication that the user account of the host device 104 is not connected to the user account of the client device 102.

At step 614, if the peer-to-peer connection is established based on the social media connection status, then, at step 618, the server 110 (see FIG. 1) stores the access credentials for the peer-to-peer connection service of the host device 104 in a connection network database 118 associated with the client device 102.

Figure 7:
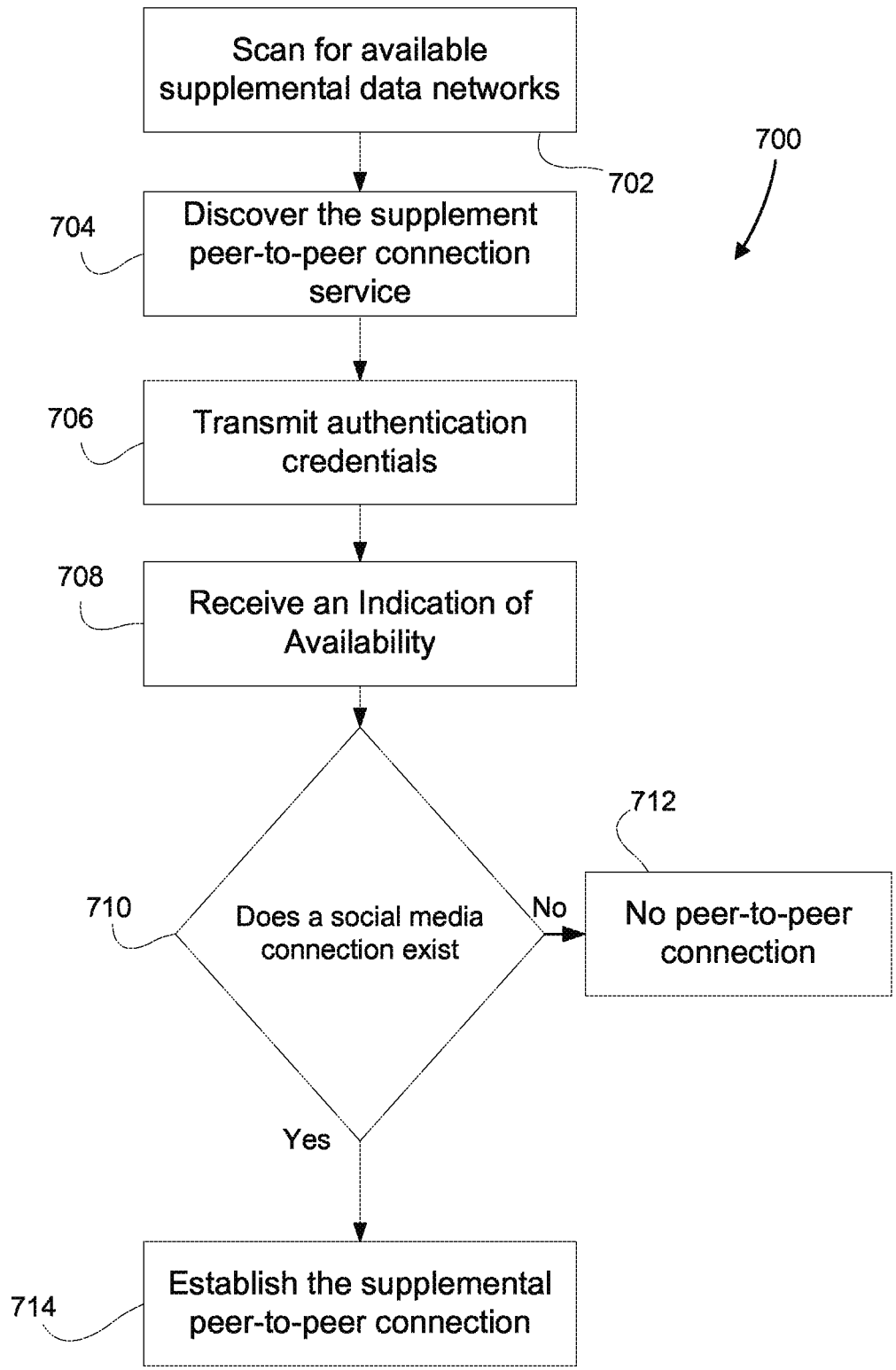
FIG. 7 is a flow diagram illustrating the step for providing a supplemental peer-to-peer connection service from a supplemental host device, according to an example embodiment.

Turning to FIG. 7, a flow chart 700 is illustrated. Flow chart 700 provides steps for establishing a supplement peer-to-peer connection with a supplemental host device (not illustrated). At step 702, the network connectivity module 218 (see FIG. 2) of the client device 102 scans for available supplemental data connection services, such as the supplemental peer-to-peer connection service. At step 704, the network connectivity module 218 of the client device 102 determines that the supplemental peer-to-peer connection service is available from the supplement host device.

At step 706, the network connectivity module 218 (see FIG. 2) of the client device 102 transmits the authentication credentials to the supplement host device, which in turn transmits the authentication credentials to the authentication service module 310 (see FIG. 3) of the server 110 (see FIG. 1). Prior to transmitting the authentication credentials, the network connectivity module 218 will query the estimation module 220 to verify that the supplemental peer-to-peer connection offers a higher quality of service than other available supplemental data networks.

At step 708, the client device 102 receives an indication of availability of the supplemental host device to provide the supplemental peer-to-peer connection service to the client device 102. The indication of availability is based on an authentication process performed by the supplemental host device and a server 110 (see FIG. 1). The authentication process utilizes the authentication credentials to determine a user of the client device 102. The authentication credentials contain user account information associated with the user of the client device 102, which the server 110 utilizes to query a user account database 114 to determine the identity of the user. The authentication credentials further contain a social media identifier associated with the user account of the client device 102, which allows the server 110 to query the social media database 116 to determine whether a social media connection exists between the user account of the client device 102 and the user account of the supplemental host device. This determination is made by comparing the social media identifier in the authentication credentials with a list of social media connections associated with the user account of the supplemental host device. Based on the determination the server 110 provides the host device 104 with information pertaining to whether the user of the client device 102 is a social media connection of the user of the supplemental host device. In certain embodiments, the server 110 may also return a type of connection, such as a work colleague, a friend or a family member.

At step 710, if the indication of availability shows that a social media connection does not exist, then at step 712, the supplemental peer-to-peer connection service is denied. However, if the indication of availability shows that the social media connection exists, then the client device 102 receives access credentials from the supplemental host device and proceeds to establish the supplemental peer-to-peer connection with supplemental host device.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a server.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method comprising:
   determining, by a client device, that a peer-to-peer connection service is being provided by a host device;
   responsive to determining that a quality of a data connection to a data network of the host device is higher than a quality of a data connection to the data network of the client device:
      transmitting, by the client device and to the host device, authentication credentials including user account information for a user associated with the client device;
      responsive to determining that a user associated with the host device is connected to the user associated with the client device through social media, establishing a data connection with the host device over the peer-to-peer connection service;
      accessing, by the client device via the data connection with the host device, the data network;
   while maintaining the data connection with the host device over the peer-to-peer connection service:
      determining, by the client device, that a supplemental peer-to-peer connection service is being provided by a supplemental host device;
      responsive to determining that a quality of a data connection to the data network of the supplement host device is higher than the quality of the data connection to the data network of the client device and higher than the quality of the data connection to the data network of the host device:
         transmitting, by the client device and to the supplemental host device, the authentication credentials; and
         responsive to determining that a user associated with the supplemental host device is connected to the user associated with the client device through social media, establishing a data connection with the supplemental host device over the peer-to-peer connection service; and
      accessing, by the client device via the data connection with the supplemental host device, the data network.

2. The method of claim 1, wherein the peer-to-peer connection service includes a unique identifier broadcast from the host device and indicates that the host device is available to provide data connection services from the data network.

3. The method of claim 1, wherein:
   the authentication credentials further include a social media identifier; and
   the user associated with the host device is connected to the user associated with the client device through the social media identified by the social media identifier.

4. The method of claim 1, wherein the data connection with the host device provides a supplemental data connection in addition to the data connection to the data network of the client device.

5. A device comprising:
one or more processors;
one or more network interfaces configured to establish a data connection to a data network; and
a storage device that stores one or more modules that, when executed, cause the one or more processors to:
determine a quality of the data connection to the data network;
determine a quality of a data connection to the data network of a host device;
responsive to determining that the quality of the data connection to the data network of the host device is higher than the quality of the data connection to the data network of the device:
transmit, to the host device, authentication credentials including user account information for a user associated with the client device;
responsive to determining that a user associated with the host device is connected to the user associated with the client device through social media, establish a data connection with the host device over the peer-to-peer connection service;
access, via the data connection with the host device, the data network;
while maintaining the data connection with the host device over the peer-to-peer connection service:
determine that a supplemental peer-to-peer connection service is being provided by a supplemental host device;
responsive to determining that a quality of a data connection to the data network of the supplement host device is higher than the quality of the data connection to the data network of the client device and higher than the quality of the data connection to the data network of the host device:
transmit, to the supplemental host device, the authentication credentials; and
responsive to determining that a user associated with the supplemental host device is connected to the user associated with the client device through social media, establish a data connection with the supplemental host device over the peer-to-peer connection service; and
access, via the data connection with the supplemental host device, the data network.

6. The device of claim 5, wherein the peer-to-peer connection service includes a unique identifier broadcast from the host device and indicates that the host device is available to provide data connection services from the data network.

7. The device of claim 5, wherein:
the authentication credentials further include a social media identifier; and
the user associated with the host device is connected to the user associated with the device through the social media identified by the social media identifier.

8. The device of claim 5, wherein the data connection with the host device provides a supplemental data connection in addition to the data connection to the data network of the device.

9. A non-transitory computer-readable storage medium encoded with instructions that, when executed, cause one or more processors of a client device to:
determine a quality of the data connection to the data network;
determine a quality of a data connection to the data network of a host device;
responsive to determining that the quality of the data connection to the data network of the host device is higher than the quality of the data connection to the data network of the device:
transmit, to the host device, authentication credentials including user account information for a user associated with the client device;
responsive to determining that a user associated with the host device is connected to the user associated with the client device through social media, establish a data connection with the host device over the peer-to-peer connection service;
access, via the data connection with the host device, the data network;
while maintaining the data connection with the host device over the peer-to-peer connection service:
determine that a supplemental peer-to-peer connection service is being provided by a supplemental host device;
responsive to determining that a quality of a data connection to the data network of the supplement host device is higher than the quality of the data connection to the data network of the client device and higher than the quality of the data connection to the data network of the host device:
transmit, to the supplemental host device, the authentication credentials; and
responsive to determining that a user associated with the supplemental host device is connected to the user associated with the client device through social media, establish a data connection with the supplemental host device over the peer-to-peer connection service; and
access, via the data connection with the supplemental host device, the data network.

10. The non-transitory computer-readable storage medium of claim 9, wherein the peer-to-peer connection service includes a unique identifier broadcast from the host device and indicates that the host device is available to provide data connection services from the data network.

11. The non-transitory computer-readable storage medium of claim 9, wherein:
the authentication credentials further include a social media identifier; and
the user associated with the host device is connected to the user associated with the device through the social media identified by the social media identifier.

12. The non-transitory computer-readable storage medium of claim 9, wherein the data connection with the host device provides a supplemental data connection in addition to the data connection to the data network of the device.

* * * * *